United States Patent Office 3,232,688
Patented Feb. 1, 1966

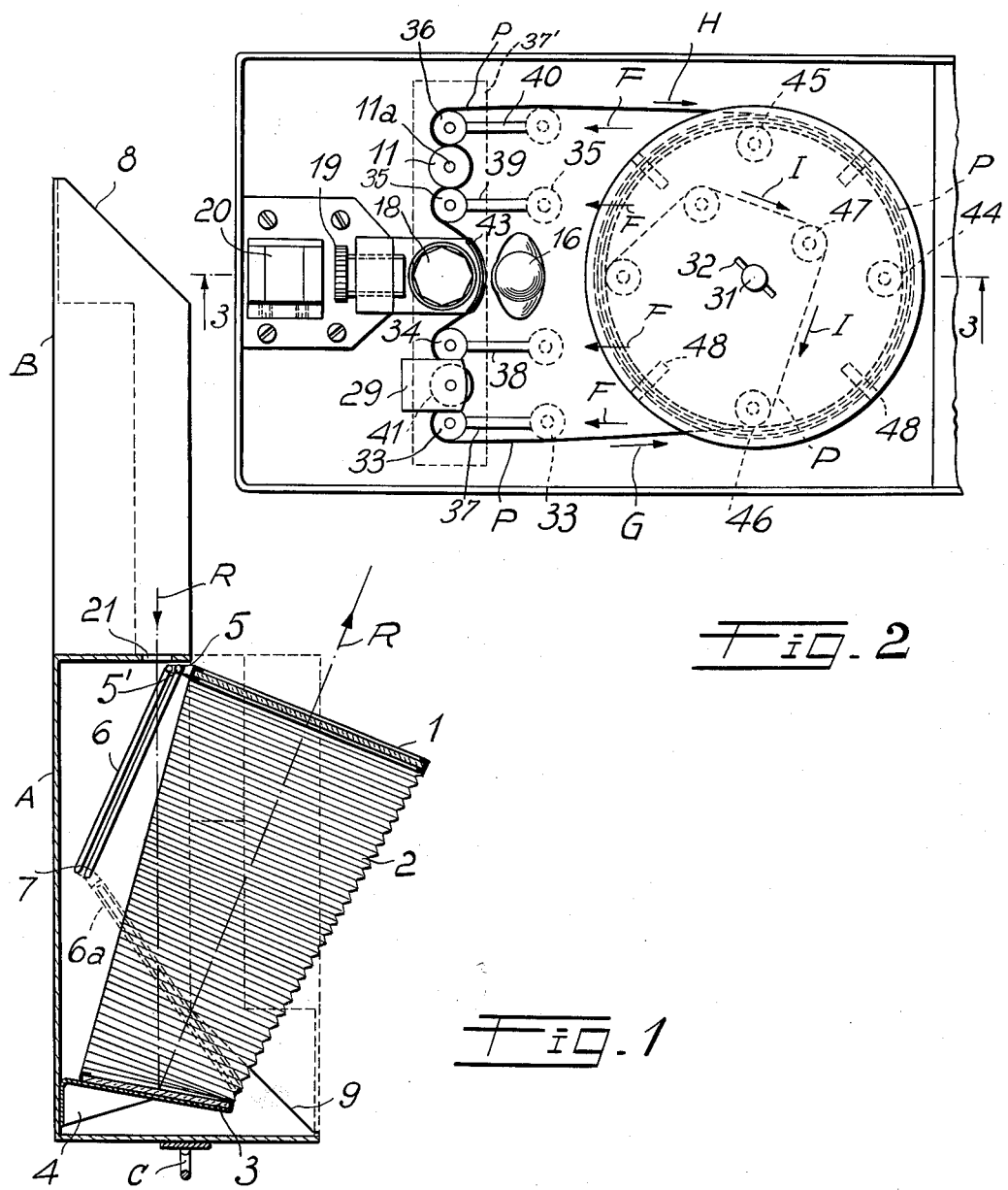

3,232,688
COLLAPSIBLE MOVIE PROJECTOR AND SCREEN
Vincenza Bavaro, Corso Regina Margherita 2,
Milan, Italy
Filed Mar. 27, 1962, Ser. No. 182,910
Claims priority, application Italy, Mar. 29, 1961,
Patent 646,630
8 Claims. (Cl. 352—27)

The present invention relates to a movie sound projector in general, and to such projector which operates with an interchangeable film-carrying reel, in particular.

It is one object of the present invention to provide a movie sound projector which comprises two parts, hinged together in such manner that upon folding back one part upon the other, it is conveniently portable like a moderately small suitcase. One of the two parts is adapted to receive a screen, retractable on a slide-guide and capable of being turned towards at least one mirror reflecting the film images, while the other part is adapted to receive a light source, an optical projection unit and an electromagnetic element for sound transmission, an electric motor, adequate means for belt conveyance and drive means for operating a toothed ratchet gear for the film. Furthermore, slide-guide elements and tensioning rollers for the film are provided, in addition to a film-carrying spool, disengageable from the projector, by which the film is wound and rewound, in order to be ready for a repeat operation.

With these and other objects in view, which will become apparent in the following detailed description, the present invention will be clearly understood in connection with the accompanying drawings, in which:

FIGURE 1 is a schematic elevation of the projector with its case in open position, several parts being omitted for the purpose of clearer demonstration;

FIG. 2 is a plan view of the part of the projector receiving the film-carrying reel;

Figure 3:
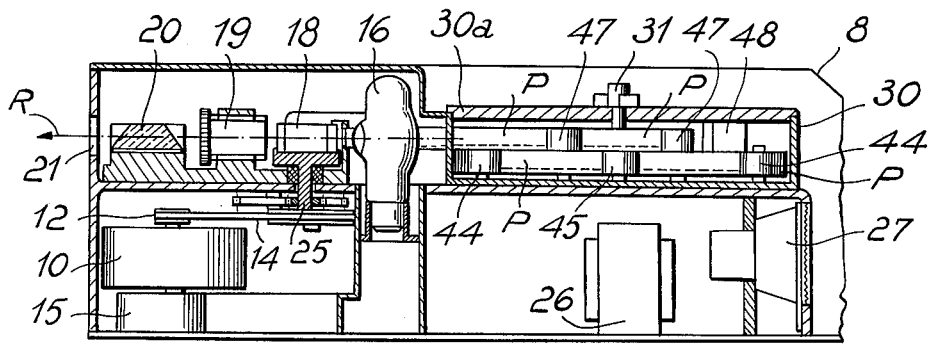
FIG. 3 is a section along the lines 3—3 of FIG. 2.

Referring now to the drawings, and in particular to FIG. 1, the projector is disposed in a housing having a rear portion A receiving the screen 1 and a front portion B receiving the film-carrying reel. The portions A and B are hingedly connected with each other by means of a hinge 5 and are capable of being folded back one upon the other, so that the housing for the projector assumes the shape of a suitcase having carrying handle C, when one of the portions A and B is superimposed on the other of the portions after folding together the bellows-type element 2 constituting the screen 1.

The bellows-type element is provided at its lower end with a small window for passage of light rays R proceeding from a light source (not shown) and the bellows-type element 2 has at its rear end a fixed refracting mirror 3 reflecting the light ray R. A bracket 4 maintains the bellows-type element 2 in a predetermined position.

At the screen 1 the bellows-type element 2 is supported by a pin 5' sliding along guides 6 in such manner that from the operative position, shown in FIG. 1, the bellows-type element 2 can be completely folded back like a harmonica against the refracting mirror 3, while the guides 6, which rotate about pins 7, are turned until the bellows-type element 2 assumes its inoperative position, shown in FIG. 1 in broken lines. In this position, the front portion B of the housing can be superimposed on the rear portion A thereof, or vice versa, so that the projector, when folded, is disposed within the confines of the portions A and B, as indicated above, when the edge formation 8 of the front part B of the housing lines up with the edge formation 9 of the rear part A of the housing.

All other elements required for the transmission of the film images to the screen 1 are arranged in the front portion B of the housing. These other elements are clearly disclosed in FIGS. 2, 3 and 4, and they comprise an electric motor 10 connected with a suitable power source, and operating the toothed wheel 11 to feed the film P, by means of the pulleys 12 and 13, and a belt 14 operatively connected with the motor 10 and by means of the shaft 11a of the toothed wheel 11, respectively.

A fan 15, coaxially disposed with the motor 10, provides cooling for a tube or light source 16 emitting light rays R through a passage 17. The light rays R, originating from the light source 16, pass at first the film P and then the optical unit consisting of a first prism 18 keyed to a shaft 25, a lens 19 and a second rectifying prism 20, all elements of the optical unit being disposed coaxially in line with a small window 21, through which the light rays R pass finally.

Figure 4:
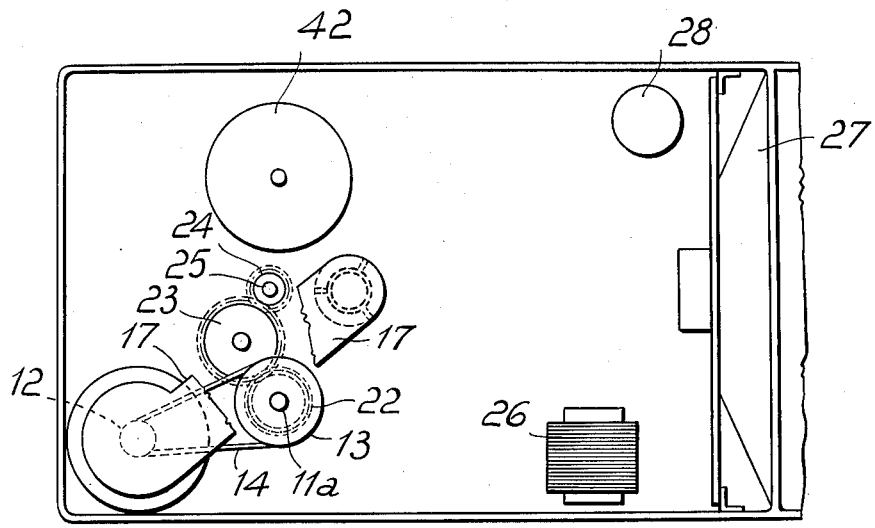
FIG. 4 is a bottom plan view of the other part of the projector, the base of the casing being removed.

The first prism 18 is subject to rotation by the motor 10 by means of a toothed gear 22 keyed to the shaft 11a. The gear 22 meshes with a gear 23, which in turn is in mesh with a gear 24 keyed to the shaft 25 of the prism 18, as shown in FIG. 4.

The projector is suitably provided with an electric transformer 26, a loud speaker 27, an amplifier 28, and a magnetic head 29 for sound production, which members are in a conventional circuit and do not require, therefore, a detailed explanation.

A film carrying reel 30 is rotatably monuted to rotate about a shaft 31 projecting from the front portion B of the housing, in order to pass the film P between the light source 16 and the first prism 18, whereby the reel 30 can be unwound. In order to change the position of the reel 30, a key 32 is disposed transversely to the shaft 31. The film P is wound on the reel 30 in a closed circuit and is rewound simultaneously, so as to be ready always for successive operations.

Film tension rollers 33, 34, 35 and 36 are arranged in pairs rotatably disposed on pivots movable along grooves 37, 38, 39, 40 provided in the forward position of the projector, so that these rollers can assume the operative position, shown in solid lines in FIG. 2, from their retracted position, as indicated in broken lines in FIG. 2. The film is wound for a given section over the tension rollers 33, 34, 35 and 36 and, alternately, from the opposite side, over the wheel 11 and also over the wheel 41, operatively connected with a fly wheel 42 by keying the fly wheel 42 to the shaft of the wheel 41, which fly wheel 42 balances out the movement of the film P.

A curvilinear slide block 43, mounted for movement in axial direction to and from the lamp 16 (FIG. 2), keeps the film P at the proper distance from the first prism 18.

In order to retain the tension rollers 33, 34, 35, 36 in their inoperative position and operative position, respectively, suitable conventional locating notches (not shown)

are provided, and one or more pressure or return springs tend to control the film movement.

The movement, which shifts the tension rollers 33, 34, 35 and 36 from their inoperative to their operative position or in opposite direction can be effected singularly manually by each of the rollers or simultaneously or jointly by a suitable centralized element 37' disposed, for example, on a frame connecting the pivots of the rollers.

In order to place the projector into operative position, the film P, extending to a necessary extent from the reel 30, is placed between the light source 16 and the guide block 43. Then the film P engages with its perforations the toothed wheel 11 and then the wheel 41 simultaneously operating the fly wheel 42, precisely opposite the magnetic head 29, and passing the guide block 43 by manual shifting of the rollers 33, 34, 35 and 36 in the direction of the arrows F until the rollers assume the operative position (FIG. 2).

In order to change a reel, that means to insert a new reel, the action is reversed, by bringing the rollers 33, 34, 35 and 36 into inoperative position in which the film P, clearing the light source 16 by manual action of raising the film P itself, permits removal of the reel from the projector, by merely sliding it off its shaft 31, as indicated previously.

At the inside of the reel 30, the film P is wound helically and is supported by small rollers 44, disposed concentrically with the reel. At least two of the small rollers 45 and 46, arranged near lateral slits for the entrance and the exit of the film P from the reel in known manner, are of a distance about double than that of the others, so as to permit support and guiding of the film P in the direction of the arrow G from the spiral winding and the re-entrance in the direction of the arrow H on to the reel 30 through the above-mentioned slits, the film P being guided at the inside of the reel 30 by other small rollers 47 in the unwinding direction of the arrow I, as shown in FIG. 2 by dotted lines.

Appropriate small blocks 48, projecting from the cover 30a, inside the reel 30, permit holding the helix of the film P on the same horizontal plane and facilitate the change of the reel 30, when the cover 30a is removed.

It is to be understood, that the projector can be carried out by other embodiments than those described above and disclosed in the drawing without leaving the spirit of the present invention.

For example, the rear part A of the housing can be secured to the front part B of the housing by detachable hinges, so that the front part B can be used separately for direct projection, using all the elements supplied in the front part B.

While I have disclosed one embodiment of the present invention, it is to be understood that this embodiment is given by example only and not in a limiting sense, the scope of the present invention being determined by the objects and the claims.

I claim:
1. A movie sound projector, comprising
a housing consisting of two separate portions,
means for hingedly connecting said portions in order to permit folding of one of said portions on the other of said portions,
a screen received by the other of said portions,
guide means disposed in said other of said portions,
a pin secured at one end of said screen and riding along said guide means to permit turning of said screen into and out from, respectively, said other of said portions,
at least one mirror rigidly secured to and disposed inside of said other of said portions in a position substantially opposite said screen while in its operative position,
said mirror being adapted to reflect film images received thereon onto said screen,
a light source, an optical projection unit, a sound transmitting electro-magnetic unit, an electric motor, gear means driven by said electric motor, a toothed wheel operated by said gear means and functioning as film moving means,
rollers for guiding said film adjustably mounted in the other of said portions,
a single film carrying reel removably mounted in the other of said portions,
all said last-mentioned elements being received by one of said portions of said housing and operatively connected relative to each other for cooperation with said screen of said other of said portions,
a bellows-like member collapsibly secured in said other of said portions,
said screen being carried at one end of said bellows-like member,
said mirror being disposed at the other end of said bellows-like member, and
said bellows-like member having an opening opposite said mirror, so that the latter reflects film images projected from said optical projection unit of said one of said portions onto said screen.

2. The movie sound projector, as set forth in claim 1, wherein
said slide guide means disposed in said other of said portions by a combined linear and turning movement collapse said bellows-like member during movement of said screen from its operative into its inoperative position.

3. The movie sound projector, as set forth in claim 1, wherein
said light source comprises an electric bulb, and
said optical projection unit includes a rotary first prism, a lens and a second immovable prism, all said elements being disposed along the same optical axis.

4. The move sound projector, as set forth in claim 3, which includes
means for rotating said first prism by said electric motor,
said rotating means including means for turning said toothed wheel adapted to enter with its teeth perforations of said film, and
means for turning said reel operatively connected with said motor.

5. The movie sound projector, as set forth in claim 4, wherein
said means for turning said toothed wheel include belt pulleys and a belt operatively connecting the latter.

6. The movie sound projector, as set forth in claim 5, wherein
said reel is disposed in the front of the one of said portions of said housing placing the portion of said film to be projected in front of said light source and upon moving said rollers into operative position, said film is rendered operative, and
said rollers being adapted to guide said film to and from said toothed wheel, respectively.

7. The movie sound projector, as set forth in claim 6, which includes
a plurality of rollers concentrically disposed in and secured to said reel,
said rollers being adapted to support said film in said reel,
said reel has entrance and exit slits for feeding said film into and out of said reel, respectively,
at least two of said rollers disposed closest to said entrance and exit slits being of about double length compared with the other of said rollers,
said reel has a cover removably secured thereto, and
blocks carried by said cover and projecting into said reel in order to maintain said film in a spiral arrangement within a horizontal plane in said reel.

8. The movie sound projector, as set forth in claim 7, which includes
    a slide block disposed between said light source and said first prism and said film moving over said slide block during operation of said film.

References Cited by the Examiner
UNITED STATES PATENTS

| | | | |
|---|---|---|---|
| Re. 16,586 | 4/1927 | Chipman | 179—100.2 |
| 947,058 | 1/1910 | Duncan | 88—24 |
| 1,906,186 | 4/1933 | Deville | 352—187 |
| 1,928,255 | 9/1933 | Holst | 352—119 |
| 2,206,134 | 7/1940 | Streykmans | 352—8 |
| 2,256,337 | 9/1941 | Boor | 352—34 |
| 2,278,781 | 11/1941 | Harrison | 352—119 |
| 2,441,013 | 5/1948 | Ehrenhaft | 352—119 |
| 2,482,031 | 9/1949 | Rose | 88—24 |
| 2,624,231 | 1/1953 | Kingston | 88—24 |

NORTON ANSHER, *Primary Examiner.*

EMIL G. ANDERSON, *Examiner.*